(12) United States Patent
Porte

(10) Patent No.: US 8,047,470 B2
(45) Date of Patent: Nov. 1, 2011

(54) SYSTEM FOR DEICING AN AIR INLET COWL FOR A TURBINE ENGINE

(75) Inventor: Alain Porte, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 611 days.

(21) Appl. No.: 12/280,104

(22) PCT Filed: Mar. 22, 2007

(86) PCT No.: PCT/FR2007/000483
§ 371 (c)(1),
(2), (4) Date: Aug. 20, 2008

(87) PCT Pub. No.: WO2007/110499
PCT Pub. Date: Oct. 4, 2007

(65) Prior Publication Data
US 2009/0020647 A1 Jan. 22, 2009

(30) Foreign Application Priority Data
Mar. 27, 2006 (FR) ..................... 06 02624

(51) Int. Cl.
*B64D 15/04* (2006.01)
(52) U.S. Cl. .................................. 244/134 B
(58) Field of Classification Search ............. 244/134 B, 244/134 R, 134 C, 53 B, 121; 60/39.093; 285/121.6, 121.7, 123.15, 123.16
See application file for complete search history.

(56) References Cited

U.S. PATENT DOCUMENTS

| 3,396,992 | A | | 8/1968 | Hale | |
|---|---|---|---|---|---|
| 4,669,757 | A | * | 6/1987 | Bartholomew | 285/55 |
| 4,674,714 | A | * | 6/1987 | Cole et al. | 244/134 B |
| 4,893,847 | A | * | 1/1990 | Hess | 285/226 |
| 5,011,193 | A | * | 4/1991 | Porte | 285/31 |
| 6,193,192 | B1 | * | 2/2001 | Porte | 244/134 B |
| 6,464,258 | B2 | * | 10/2002 | Shin | 285/49 |
| 6,682,102 | B1 | * | 1/2004 | Betz | 285/123.15 |
| 2003/0217778 | A1 | | 11/2003 | Challender | |

FOREIGN PATENT DOCUMENTS

| EP | 0 918 150 | 5/1999 |
|---|---|---|
| GB | 2 220 719 | 1/1990 |

OTHER PUBLICATIONS

International Search Report dated Aug. 6, 2007 w/ English translation.
Written Opinion of the International Searching Authority with English translation.

* cited by examiner

*Primary Examiner* — Timothy D Collins
*Assistant Examiner* — Jamie S Stehle
(74) *Attorney, Agent, or Firm* — Dickinson Wright PLLC

(57) ABSTRACT

According to the invention, a scaled articulation device is mounted on at least one of the branches of a hot-air circulation circuit in the form of a bracket so as to provide a bracket with capabilities of deforming about the articulation device.

8 Claims, 8 Drawing Sheets

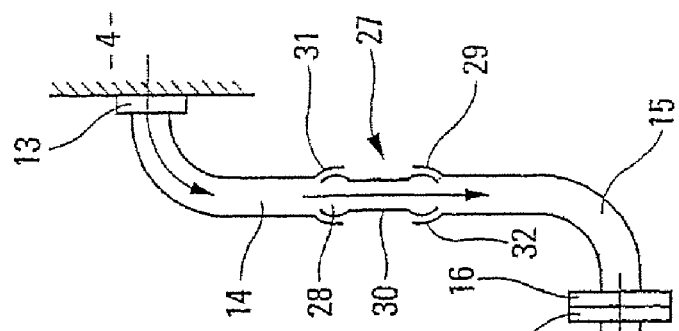
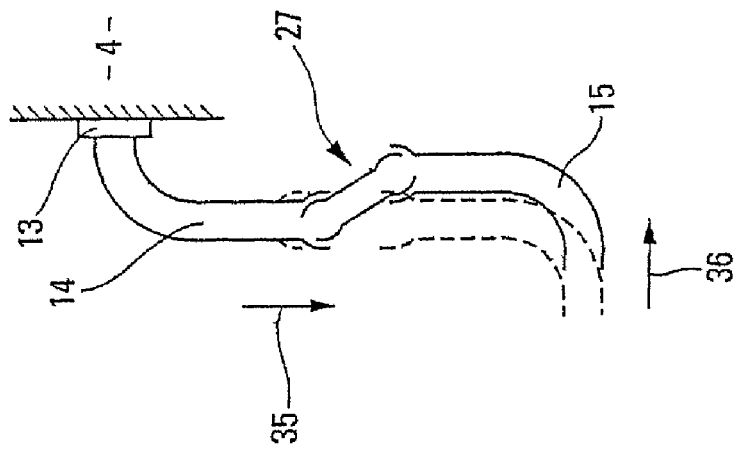
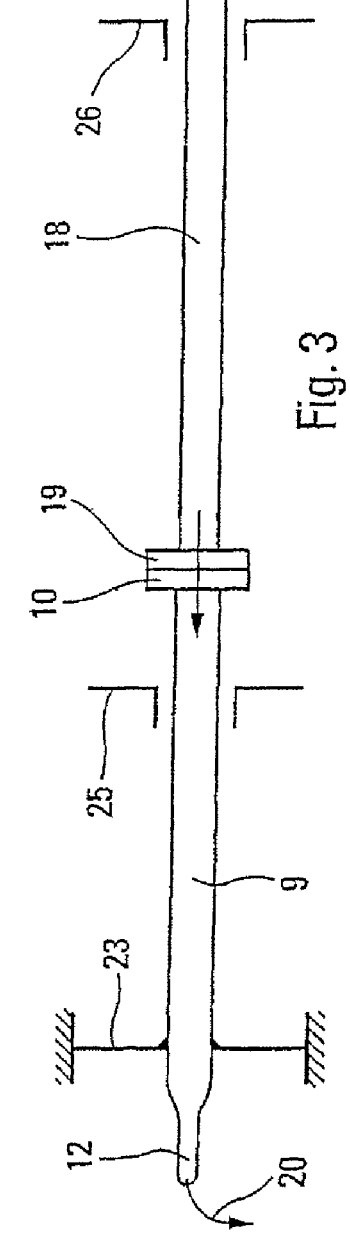
Fig. 3
Fig. 4

SYSTEM FOR DEICING AN AIR INLET COWL FOR A TURBINE ENGINE

TECHNICAL FIELD OF THE INVENTION

The present invention relates to the deicing of air inlet cowls of turbine engines, in particular for aircraft.

BACKGROUND OF THE INVENTION

It is known that, if required (to prevent ice from forming or to eliminate ice which has already formed), the leading edge of the air inlet cowl of such turbine engines is deiced by heating using pressurized hot air bled from said turbine engine and supplied to said leading edge by a hot-air circulation circuit. Such a hot-air circulation circuit comprises, in a known manner, two branches forming a right-angled structure, namely a transverse branch connected to said turbine engine and a longitudinal branch arranged laterally with respect to said turbine engine and connected to an injector in contact with said leading edge.

However, the hot air bled from the turbine engine is at a high temperature, for example around 500° C., and at a high pressure too, for example around 10 to 20 bar. As a result, the right-angled branches of said hot-air circulation circuit, which are embodied as steel tubes, are subjected to considerable variations in length through the temperature effect, and possibly pressure effect, of said hot air. Consequently, the rigid right-angled structure formed by said transverse and longitudinal branches tends to deform, and the means for fastening said hot-air circulation circuit to said air inlet cowl and the means for bleeding pressurized hot air from the turbine engine experience considerable stresses, possibly damaging them or destroying them.

SUMMARY OF THE INVENTION

The object of the present invention is to overcome this disadvantage.

To this end, according to the invention, the system for deicing the hollow leading edge of an air inlet cowl for a turbine engine, in particular for an aircraft, said deicing system comprising:
- an injector designed to inject pressurized hot air inside said hollow leading edge;
- means for bleeding off pressurized hot air that are mounted on the hot-stream generator of said turbine engine;
- a hot-air circulation circuit for conveying said pressurized hot air from said bleed means to said injector, said hot-air circulation circuit comprising two branches forming a right-angled structure, namely:
  - a transverse branch whose end is rigidly connected to said bleed means, and
  - a longitudinal branch which is arranged laterally with respect to said turbine engine and whose end is connected to said injector; and
- fastening means arranged in the region of said injector and intended to fasten said longitudinal branch to said air inlet cowl, is distinguished in that a sealed articulation device is mounted on at least one of said branches of said hot-air circulation circuit to provide said right-angled structure with capabilities of deforming about said articulation device.

Thus, by virtue of said sealed articulation device or devices, the right-angled structure formed by said transverse and longitudinal branches can itself deform during variations in length of said branches through the temperature effect and/or pressure effect of said hot air, said branches adapting their relative position to their actual lengths without applying excessive stresses to the means for fastening said hot-air circulation circuit.

The sealed articulation device or devices can be of any known type, such as the flexible sleeve type, bellows type, etc. However, each sealed articulation device is preferably of the swivel joint type.

To further increase the capabilities of said hot-air circulation circuit deforming about said articulation or articulations, it is advantageous for each of them to comprise two swivels spaced apart along said corresponding branch of the hot-air circuit.

Of course, said hot-air circulation circuit according to the present invention can be formed by a simple pipe. However, given the high temperature of the hot air which passes through it, said circuit radiates heat which can damage certain structures of said air inlet cowl that are in the vicinity of said hot-air circulation circuit. In addition, for obvious safety reasons, it is advantageous to provide a protection for said surrounding structures, in the event of leaks of pressurized hot air or in the event of a breakage in said pipe.

Hence, according to a key feature of the present invention whereby the latter disadvantages can be avoided, an external protective casing is provided both on the transverse branch and on the longitudinal branch of said hot-air circulation circuit.

Thus, in an advantageous embodiment, each articulated branch of said hot-air circulation circuit comprises an internal hot-air-ducting element, provided with said sealed articulation device, and an external protective casing element surrounding said internal element, said external element being provided with a conjoint articulation device arranged and produced in correspondence with said sealed articulation device of said internal element.

In this latter embodiment, it is advantageous, for reasons of checking and carrying out maintenance on the sealed articulation device of said internal element, that said external protective casing element is removable. To this end, at least one of the articulation devices of the internal element and of the external element can be of the detachable swivel joint type. For the latter purpose, the articulation device in question can comprise a swivel cooperating with a cylindrical surface.

Experience has shown that, to achieve the result aimed for by the present invention, it is sufficient in most cases for only said transverse branch of said hot-air circulation circuit to be articulated.

In a first preferred embodiment of the deicing system according to the present invention:
- said longitudinal branch of the hot-air circulation circuit is constituted by an internal hot-air-ducting element and by an external protective casing element surrounding said internal element;
- one of the two internal and external constituent elements of said longitudinal branch is longitudinally rigid, whereas the other of said constituent elements comprises at least two parts which are nested one inside the other and which are capable of sliding with respect to one another in a sealed manner;
- the two constituent elements of said longitudinal branch are secured to one another at their two ends;
- in the region of said injector, the two constituent elements are rigidly connected in common to said fastening means; and
- in the region of said transverse branch, on the one hand, said internal hot-air-ducting elements of said longitudinal and transverse branches are secured to one another and, on the other hand, said external protective casing elements of said longitudinal and transverse branches are likewise secured to one another.

By virtue of such an arrangement, that one of said elements of said longitudinal branch which is rigid serves as a tie bar for the other one of these elements that is constituted by said nested and sliding parts, such that the elongation of said longitudinal branch through the pressure effect of the hot air is in practice limited to the elongation of said rigid element through the temperature effect of said hot air. It is thus possible to limit the deformation of the right-angled structure formed by said transverse and longitudinal branches, and hence the degree of rotation of said articulation devices of the internal element and of the external element of said transverse branch.

In a second preferred embodiment of the deicing system according to the present invention, employing such an elongation-limiting feature:

said longitudinal branch of the hot-air circulation circuit comprises at least two sections mounted one at the end of the other;

each of said sections is constituted by an internal hot-air-ducting element and by an external protective casing element surrounding said internal element;

one of the constituent elements of each of said sections is longitudinally rigid, whereas the other of said constituent elements comprises at least two parts which are nested one inside the other and which are capable of sliding with respect to one another in a sealed manner;

the two constituent elements of each of said sections are secured to one another at their two ends;

the two sections of said longitudinal branch are joined together so as to connect their constituent elements, respectively;

in the region of said injector, the two constituent elements of one of the two sections are rigidly connected in common to said fastening means; and in the region of said transverse branch, on the one hand, said internal hot-air-ducting elements of the other of said sections and of the transverse branch are secured to one another and, on the other hand, said external protective casing elements of said other section and of said transverse branch are likewise secured to one another.

Moreover, it is advantageous that, in the region of said injector, said fastening means comprise a partition which closes off said hollow leading edge.

BRIEF DESCRIPTION OF THE DRAWINGS

The figures of the appended drawing will give a clear understanding of how the invention can be implemented. In these figures, identical references denote like elements.

FIG. 3 schematically shows a first exemplary embodiment of said deicing system.

FIG. 4 schematically illustrates the deformation of the deicing system of FIG. 3 when said system is traversed by pressurized hot air.

DETAILED DESCRIPTION OF THE INVENTION

Figure 1:
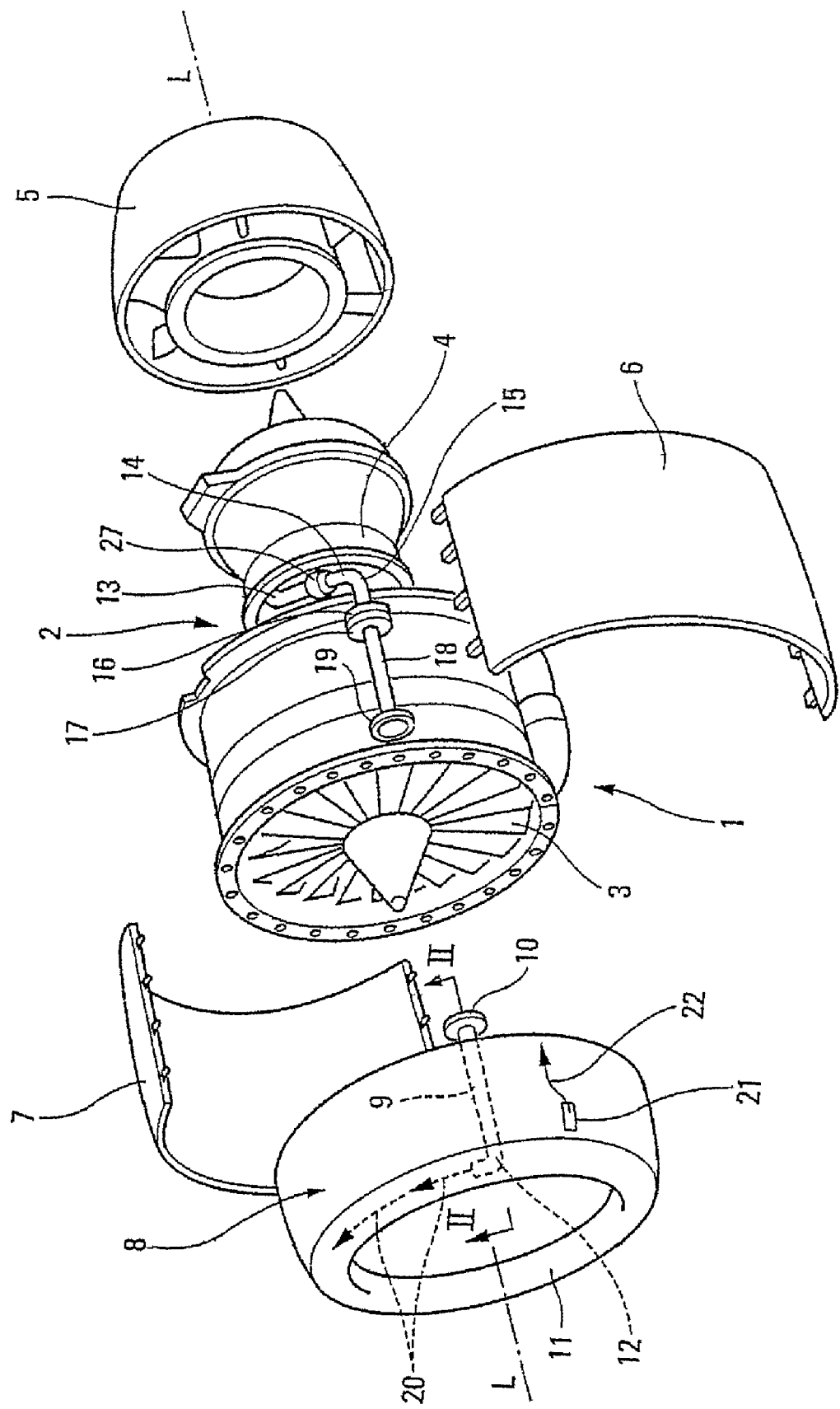
FIG. 1 is an exploded schematic view of a turbine engine, on which are represented the air inlet cowl and its deicing system.

The bypass engine 1 represented schematically in FIG. 1 has a longitudinal axis L-L and comprises, in a known manner, a central hot-air generator 2, a fan 3 and compressor stages 4. The engine 1 is assigned, and has fastened to it, a nozzle assembly 5, two lateral cowls 6 and 7 and an air inlet cowl 8.

Figure 2:
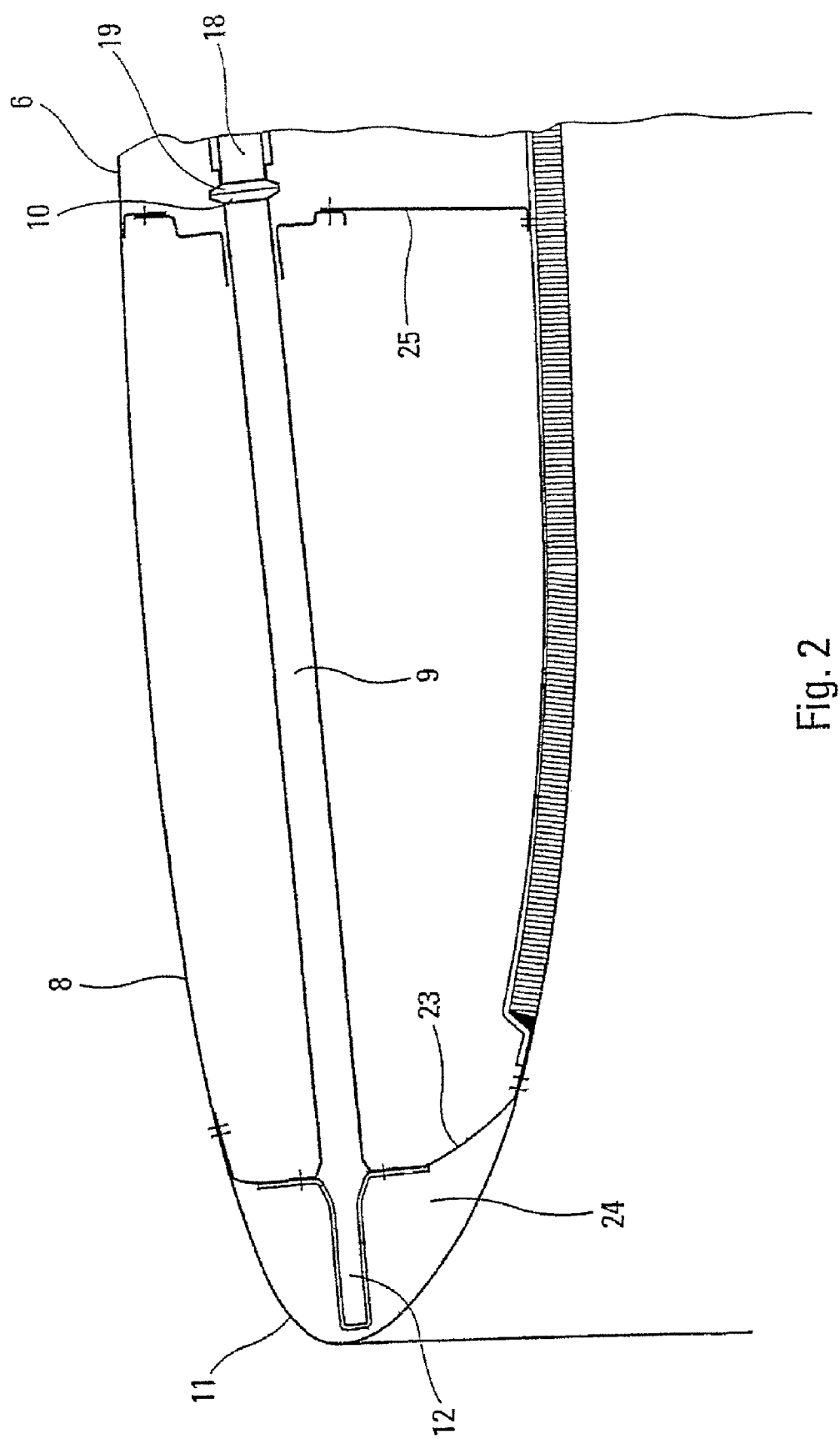
FIG. 2 is an enlarged view in part section of said air inlet cowl taken on line II-II of FIG. 1.

As is illustrated schematically by FIGS. 1 and 2, the air inlet cowl 8 comprises an internal lateral longitudinal duct 9 provided, at its rear end directed toward the engine 1, with a coupling element 10 and, at its front end housed in the hollow leading edge 11 of said air inlet cowl, with an injector 12. Furthermore, a compressor stage 4 of the engine 1 has a pressurized hot-air intake 13 arranged on it which is connected to an internal transverse duct 14, itself connected by an elbow 15 and by cooperating coupling elements 16, 17 to a longitudinal duct 18, housed between the fan 3 and the lateral cowl 6. At the opposite end to the coupling element 17, the longitudinal duct 18 is provided, facing the coupling element 10 of the longitudinal duct 9, with a complementary coupling element 19.

Thus, when the complementary coupling elements 16 and 17, on the one hand, and 10 and 19, on the other hand, are connected to one another, the ducts 9, 14 and 18 constitute a hot-air circulation circuit forming a right-angled structure comprising a transverse branch 14 and a longitudinal branch 9, 18, and the circuit is traversed by hot air (for example at a temperature of 500° C.) bled at 13 from the engine 1 and conveyed to the injector 12. Said injector can thus blow this pressurized hot air (dotted arrows 20) inside the leading edge 11 in order to deice it. At least one orifice 21 is provided in the external surface of the cowl 8 in order to discharge to the free air (arrows 22) the hot air having circulated inside the leading edge 11 (then, for example, at a temperature of 200° C.).

As is shown in detail and on a larger scale in FIG. 2, the hollow leading edge 11 is closed on the rear side by an internal annular partition 23, such that an annular peripheral chamber 24 is formed inside said leading edge 11. The injector 12 and the corresponding end of the longitudinal duct 9 are fastened to the internal partition 23, and said injector, arranged in said annular chamber 24, injects pressurized hot air 20 therein. The orifice 21 places said annular chamber 24 in communication with the outside.

On the opposite side to the leading edge 11, the air inlet cowl 8 is closed off by an internal annular partition 25, through which the end of the longitudinal duct 9 which bears the coupling element 10 passes freely by sliding.

As is illustrated schematically by FIG. 3, the right-angled hot-air circulation circuit 9, 14, 18 is thus fastened to the engine 1, at its ends, by way of the pressurized air intake 13 and the partition 23 and supported in a sliding manner by the partition 25 and, if appropriate, other intermediate means 26, for example articulated connecting rods which are not otherwise shown.

According to the present invention, an articulation device 27 is mounted on the transverse branch 14 and this device comprises two spaced-apart swivels 28, 29 respectively mounted at the ends of a duct section 30 interposed in the duct 14. The swivels 28, 29 respectively cooperate with spherical seats 31, 32 secured to the duct 14.

Figure 5:
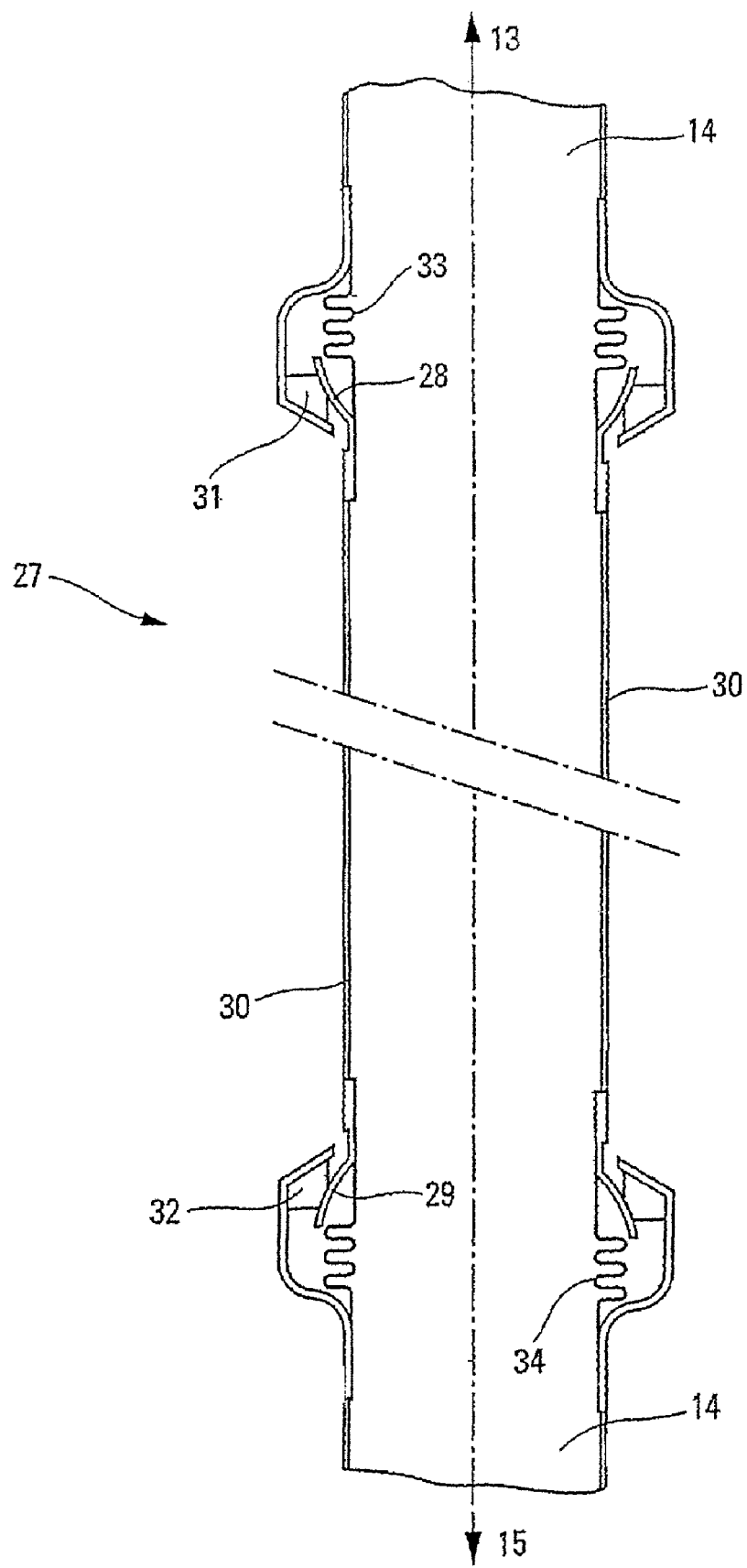
FIG. 5 schematically shows in section an exemplary embodiment of the articulation of the deicing system of FIG. 3.

FIG. 5 illustrates a practical exemplary embodiment of the articulation device 27. In this example, sealing bellows 33, 34, respectively between the swivel 28 and the seat 31 and between the swivel 29 and the seat 32, have been provided.

It will be readily understood that, in an equivalent manner to what has been described above, the swivels 28, 29 could be secured to the duct 14, while the spherical seats 31, 32 would be secured to the duct section 30.

As is illustrated schematically in FIG. 4, when the hot-air circulation circuit is traversed by the hot air, the transverse branch 14 experiences a transverse elongation with respect to the turbine engine 1, depicted by the arrow 35, while the longitudinal branch 9, 18 experiences a longitudinal elongation depicted by the arrow 36. Owing to the presence of the articulation device 27, the right-angled structure formed by said branches 14 and 9, 18 then deforms, thereby avoiding excessive stresses being applied to the pressure intake 13 and to the partition 23.

Figure 6:
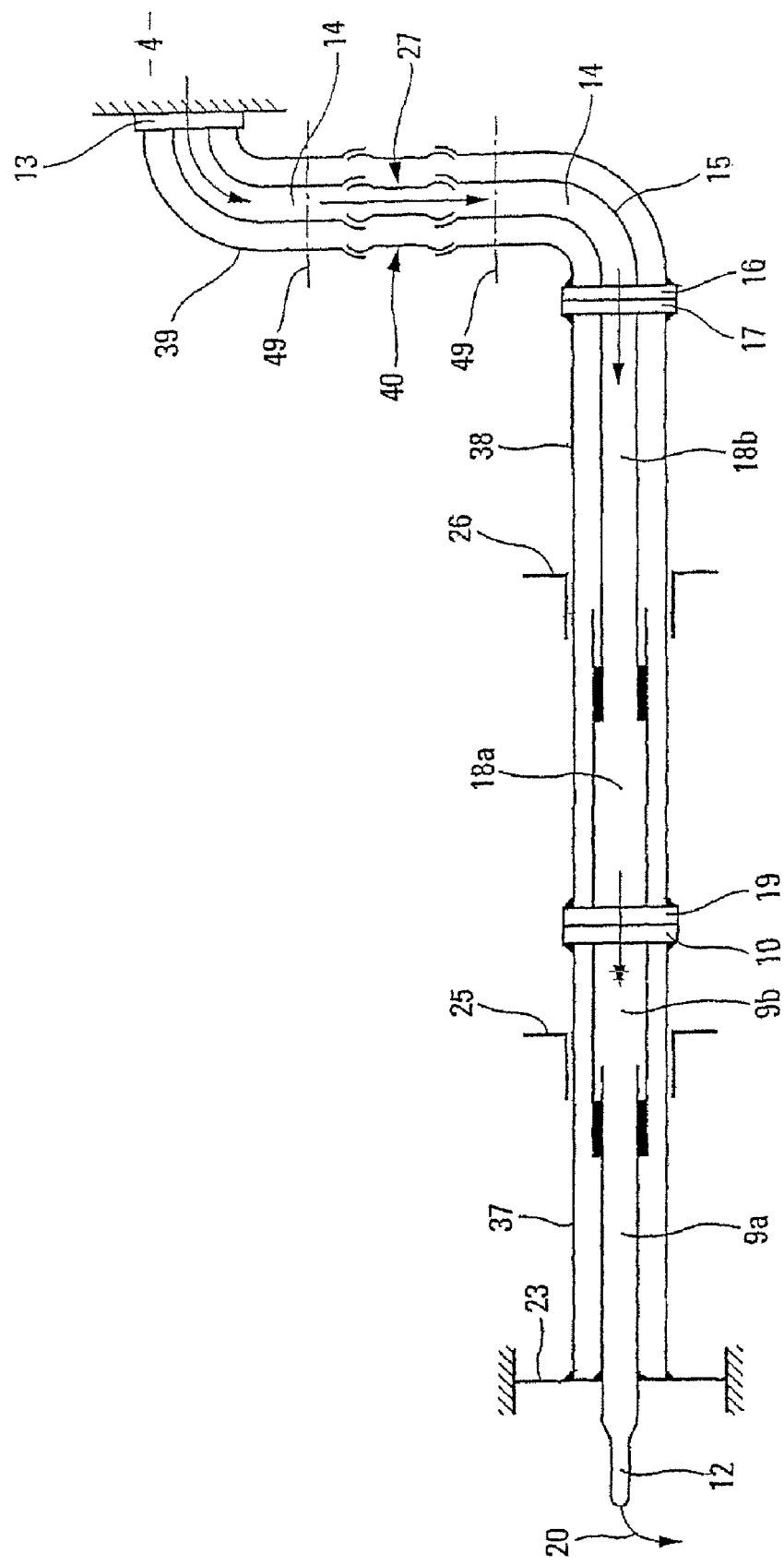
FIGS. 6 and 7 schematically show a second and third exemplary embodiment of said deicing system, respectively.

In the deicing system shown schematically by FIG. 6, the elements 4, 9, 10, 12 to 20, 23 and 25 to 27 described in relation to FIG. 3 appear once again. However, in the system of FIG. 6:

the longitudinal duct 9 is composed of two elements 9a, 9b which are nested telescopically and in a sealed manner one inside the other, the element 9a being secured to the partition 23 and to the injector 12, whereas the element 9b is connected to the coupling element 10;

the longitudinal duct 18 is composed of two elements 18a, 18b which are nested telescopically and in a sealed manner one inside the other, the elements 18a and 18b being respectively connected to the coupling elements 19 and 17;

the longitudinal duct 9a, 9b is surrounded by a longitudinally rigid external protective casing 37 secured, on one side, to the partition 23 and, on the other side, to the coupling element 10;

the external protective casing 37 passes freely through the partition 25 by sliding;

the longitudinal duct 18a, 18b is surrounded by a longitudinally rigid external protective casing 38 secured, on the one side, to the coupling element 19, and, on the other side, to the coupling element 17;

the external protective casing 38 is free to slide with respect to the intermediate support means 26; and the transverse duct 14 is surrounded by a longitudinally rigid external protective casing 39 secured, on the one side, to the coupling element 16 and, on the other side, to the pressurized hot-air intake 13, said external protective casing 39 being provided with a conjoint articulation device 40 arranged and produced in correspondence with the articulation device 27.

Figure 7:
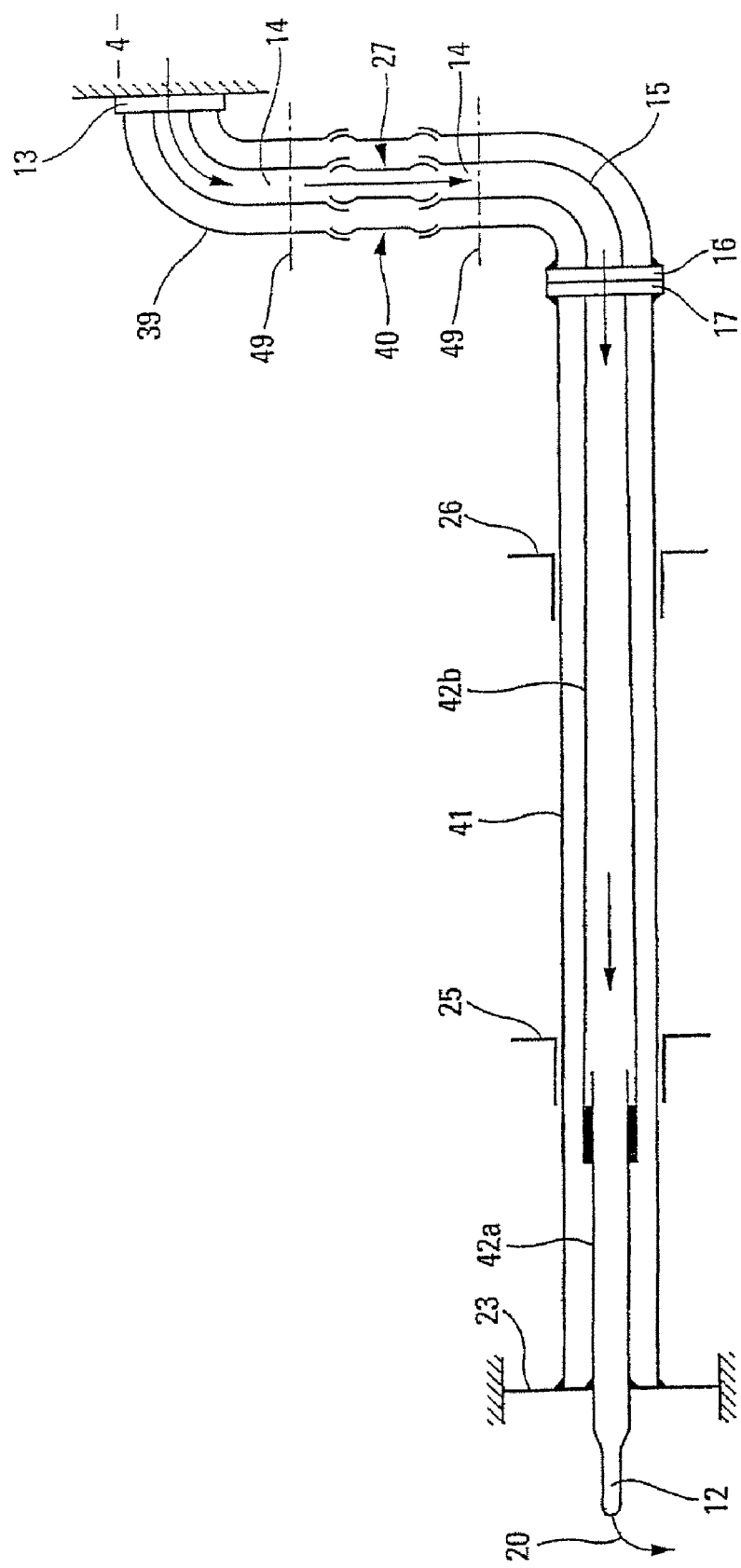

In the variant embodiment shown in FIG. 7, the external protective casing 39 and the articulation device 40 appear once again. The differences over the system shown in FIG. 6 are as follows:

the coupling elements 10 and 19 have been dispensed with;

the external protective casings 37 and 38 have been replaced by a single longitudinally rigid external protective casing 41 secured, on the one side, to the partition 23 and, on the other side, to the coupling element 17; and the internal elements 9a, 9b and 18a, 18b of the longitudinal ducts 9 and 18 have been replaced by a single internal hot-air-ducting element comprising two parts 42a, 42b which are nested one inside the other and which are capable of sliding with respect to one another in a sealed manner, the part 42a being connected to the injector 12 and the part 42b being connected to the coupling element 17.

Figure 8:
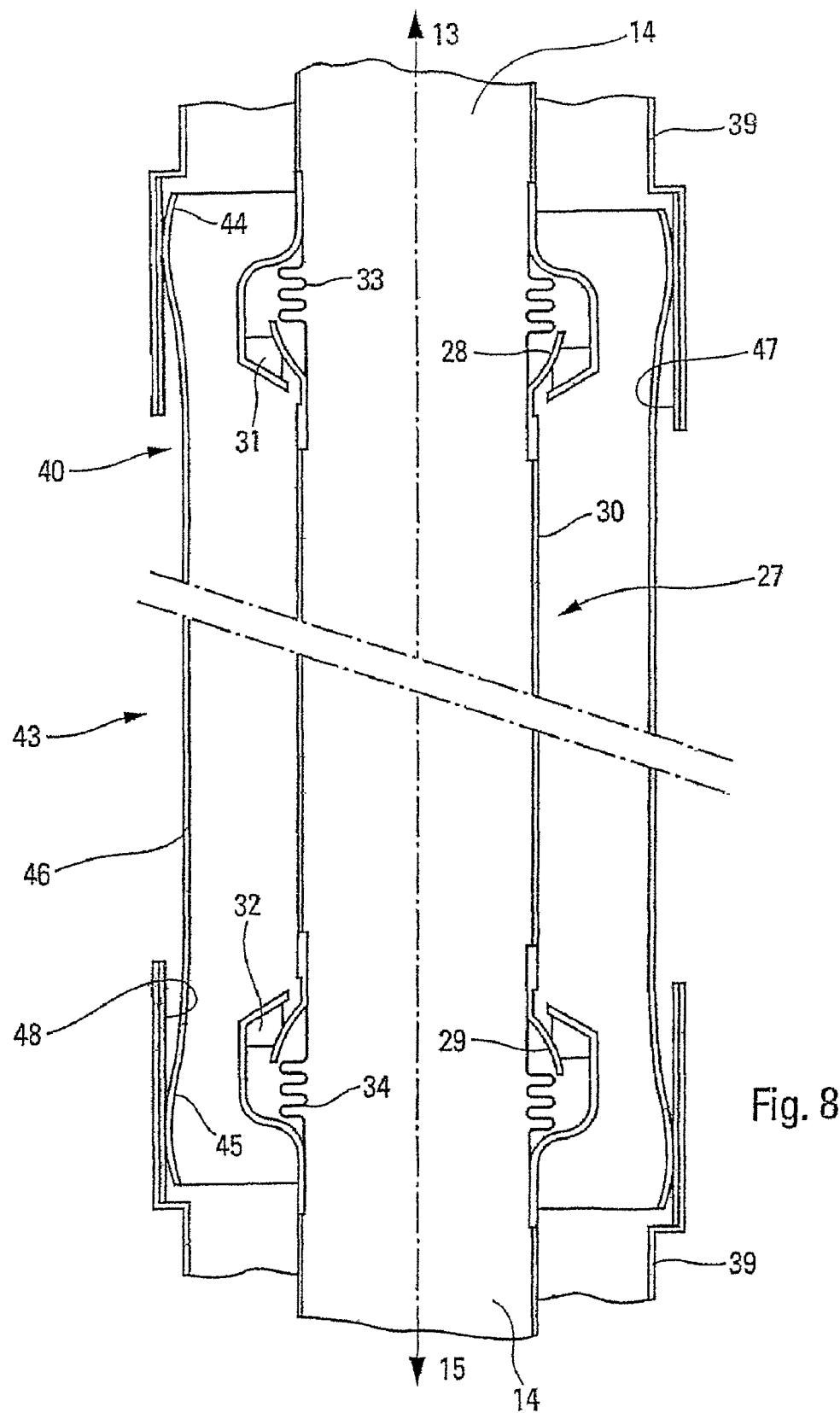
FIGS. 8 and 9 schematically show in section two exemplary embodiments of the articulation for the deicing systems of FIGS. 6 and 7.

FIG. 8 shows an example of a combined articulation system 43, comprising conjoint articulation devices 27 and 40 for the deicing systems shown in FIGS. 6 and 7.

In the combined articulation system 43, the articulation device 27 is identical to that described in relation to FIG. 5. As for the articulation device 40, it comprises two spaced-apart swivels 44, 45 respectively mounted at the ends of a protective casing section 46 which is interposed in the protective casing 39 and which encases the duct section 30. The swivels 44, 45 respectively cooperate with cylindrically open seats 47, 48 secured to said protective casing 39.

It will be readily understood that, by providing coupling means 49 (for example of the type designated by the reference 53 in FIG. 9) on the internal protective casing 39, upstream and/or downstream of the articulation devices 27 and 40, it is possible to detach the assembly 44, 45, 46 from the cylindrical seats 47, 48 and hence gain access to the articulation device 27, for example for a maintenance operation.

Figure 9:
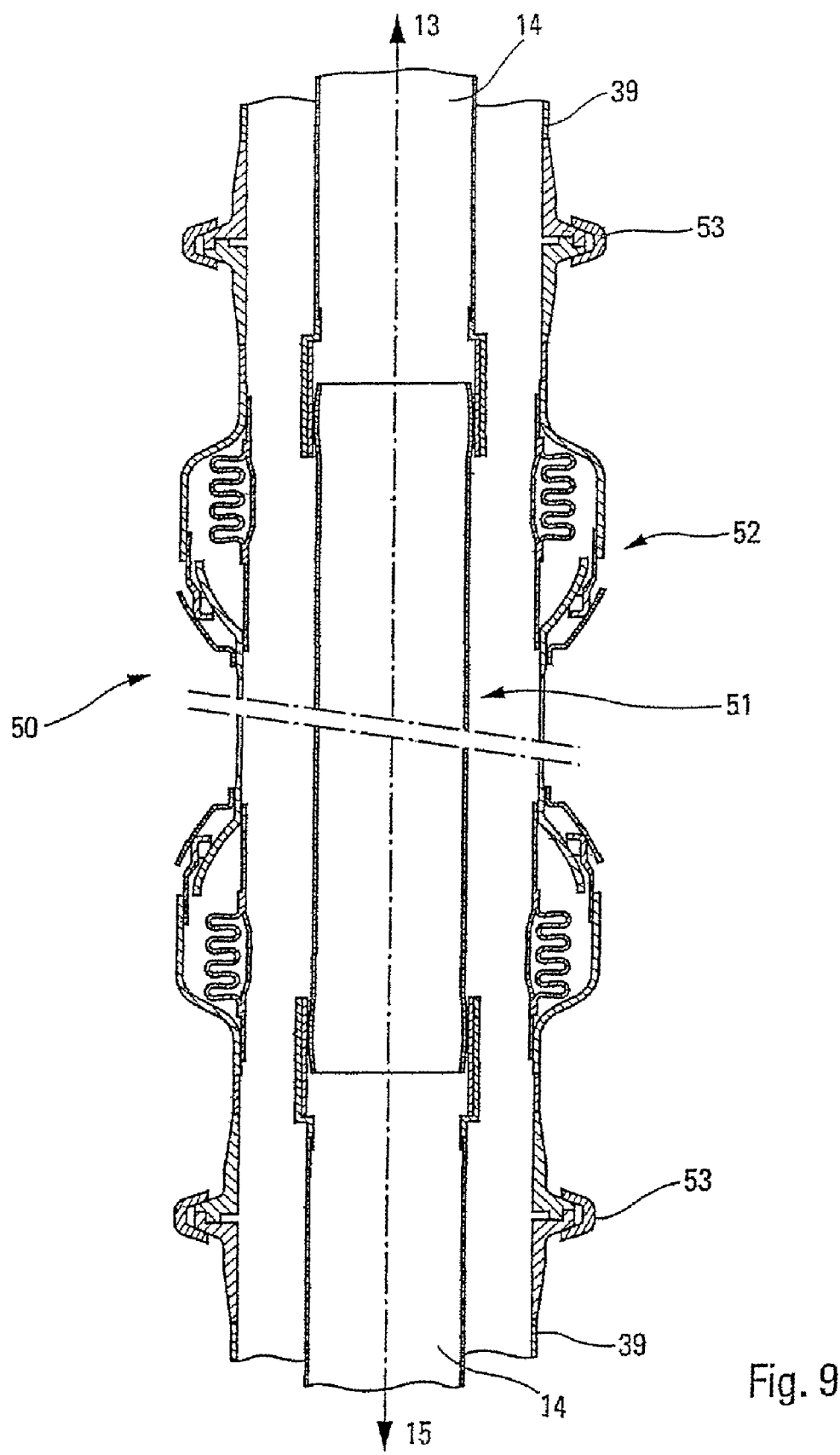

FIG. 9 shows a variant 50 of the conjoint articulation system 43 shown in FIG. 8. In this variant 50, an articulation device 51, similar to the articulation device 40, is interposed in the duct 14, while an articulation device 52, similar to the articulation device 27, is interposed in the protective casing 39 by way of at least one quick coupling 53.

In the variant 50 of the articulation system, the articulation device 51 is both easily accessible and removable.

The invention claimed is:

1. A system for deicing a hollow leading edge of an air inlet cowl of an aircraft turbine engine said deicing system comprising:

an injector designed to inject pressurized hot air inside said hollow leading edge;

a hot air intake mounted on a hot-stream generator of said turbine engine;

a hot-air circulation circuit for conveying said pressurized hot air from said hot air intake to said injector, said hot-air circulation circuit forming a right-angled structure comprised of a transverse branch rigidly connected to said hot air intake, and a longitudinal branch arranged laterally with respect to said turbine engine and whose end is connected to said injector;

a fastening unit arranged in the region of said injector for fastening said longitudinal branch to said air inlet cowl; and a sealed articulation device comprised of two mutually secured swivels mounted on at least one of said transverse branch and said longitudinal branch of said hot-air circulation circuit to provide said right-angled structure with capabilities of deforming about said articulation device; and an external protective casing surrounding said transverse branch and provided with a conjoint articulation device arranged and produced in correspondence with said sealed articulation device.

2. The deicing system as claimed in claim 1, wherein the external protective casing is removable.

3. The deicing system as claimed in claim 1, wherein at least one of the swivels is a detachable joint type swivel.

4. The deicing system as claimed in claim 3, wherein, in each detachable joint type swivel, said swivel cooperates with a cylindrical surface.

5. The deicing system as claimed in claim 1, wherein the swivels are mounted on the transverse branch of said hot-air circulation circuit.

6. The deicing system as claimed claim 1, wherein:

said longitudinal branch of the hot-air circulation circuit is constituted by an internal hot-air-ducting element and by an external surrounding said two constituent elements of said branch is longitudinally rigid, other of said constituent elements least two parts which are nested one inside the other and which are capable of sliding with respect to one another in a sealed manner;

the two constituent elements of said longitudinal branch are secured to one another at their two ends;

in the region of said injector, the two constituent elements are rigidly connected in common to said fastening unit; and in the region of said transverse branch, on the one hand, said internal hot-air-ducting elements of said longitudinal and transverse branches are secured to one another and, on the other hand, said external protective casing elements of said longitudinal and transverse branches are likewise secured to one another.

7. The deicing system as claimed in claim 1, wherein:

said longitudinal branch of the hot-air circulation circuit comprises at least two sections mounted one at the end of the other;

each of said sections is constituted by an internal hot-air-ducting element and by an external protective casing element surrounding said internal element;

one of the constituent elements of each of said sections is longitudinally rigid, whereas the other of said constituent elements comprises at least two parts which are nested one inside the other and which are capable of sliding with respect to one another in a sealed manner;

the two constituent elements of each of said sections are secured to one another at their two ends;

the two sections of said longitudinal branch are joined together so as to connect their constituent elements, respectively;

in the region of said injector, the two constituent elements of one of the two sections are rigidly connected in common to said fastening unit; and in the region of said transverse branch, on the one hand, said internal hot-air-ducting elements of the other of said sections and of the transverse branch are secured to one another and, on the other hand, said external protective casing elements of said other section and of said transverse branch are likewise secured to one another.

8. The deicing system as claimed in claim 1, wherein said fastening unit comprises a partition which closes off said hollow leading edge.

\* \* \* \* \*